(12) United States Patent
Chen et al.

(10) Patent No.: US 12,062,175 B2
(45) Date of Patent: Aug. 13, 2024

(54) METHOD FOR PROCESSING IMAGES, ELECTRONIC DEVICE, AND STORAGE MEDIUM

(71) Applicant: HON HAI PRECISION INDUSTRY CO., LTD., New Taipei (TW)

(72) Inventors: I-Hua Chen, New Taipei (TW); Wan-Jhen Lee, New Taipei (TW); Tzu-Chen Lin, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 360 days.

(21) Appl. No.: 17/585,837

(22) Filed: Jan. 27, 2022

(65) Prior Publication Data

US 2022/0245819 A1 Aug. 4, 2022

(30) Foreign Application Priority Data

Feb. 4, 2021 (CN) .......................... 202110158958.3

(51) Int. Cl.
*G06T 7/10* (2017.01)
*G06T 11/00* (2006.01)
(52) U.S. Cl.
CPC ................ *G06T 7/10* (2017.01); *G06T 11/00* (2013.01); *G06T 2207/30004* (2013.01)
(58) Field of Classification Search
None
See application file for complete search history.

(56) References Cited

U.S. PATENT DOCUMENTS

| | | | | |
|---|---|---|---|---|
| 5,060,171 A | * | 10/1991 | Steir | G06T 19/006 345/630 |
| 9,202,312 B1 | * | 12/2015 | Zingaretti | A45D 44/005 |
| 2005/0244057 A1 | * | 11/2005 | Ikeda | G06V 40/171 382/165 |
| 2007/0150247 A1 | * | 6/2007 | Bodduluri | G16H 50/50 703/11 |
| 2009/0046891 A1 | * | 2/2009 | Ikeda | G06T 7/73 382/100 |
| 2011/0299776 A1 | * | 12/2011 | Lee | G06V 40/171 382/173 |
| 2017/0000570 A1 | * | 1/2017 | Zhang | A61B 5/0077 |
| 2017/0270679 A1 | * | 9/2017 | Koven | H04N 17/002 |
| 2020/0357178 A1 | * | 11/2020 | Lin | A45D 44/005 |
| 2022/0164852 A1 | * | 5/2022 | Punyani | G06V 10/82 |
| 2022/0198727 A1 | * | 6/2022 | Khadem | G06Q 30/0643 |

FOREIGN PATENT DOCUMENTS

TW I532006 B 5/2016

* cited by examiner

*Primary Examiner* — Wen W Huang
(74) *Attorney, Agent, or Firm* — ScienBiziP, P.C.

(57) ABSTRACT

A method for processing images, an electronic device, and a storage medium are provided. A head portrait of a subject is obtained from a camera device. A hair region and a scalp region are identified from the head portrait. A proportion of the scalp region is calculated. The proportion of the scalp region is compared with a preset value, and baldness of the subject is determined accordingly. If found to be bald, complementary color processing is performed by processing the scalp region using a hair color of the hair region, and an updated head portrait is obtained after finishing the complementary color processing. The method automatically detects baldness and supplements the hair color in the scalp region.

17 Claims, 3 Drawing Sheets

METHOD FOR PROCESSING IMAGES, ELECTRONIC DEVICE, AND STORAGE MEDIUM

FIELD

The present application relates to a technical field of image analysis, and more particularly to a method for processing images, an electronic device, and a storage medium.

BACKGROUND

In image processing, it is impossible to accurately detect whether a subject in an image is bald, and it is also impossible to process a bald region in the image, which is not conducive to maintaining the image.

DETAILED DESCRIPTION

The accompanying drawings combined with the detailed description illustrate the embodiments of the present disclosure hereinafter. It is noted that embodiments of the present disclosure and features of the embodiments can be combined, when there is no conflict.

Various details are described in the following descriptions for a better understanding of the present disclosure, however, the present disclosure may also be implemented in other ways other than those described herein. The scope of the present disclosure is not to be limited by the specific embodiments disclosed below. Unless defined otherwise, all technical and scientific terms used herein have the same meaning as commonly understood by one of ordinary skill in the art to which the present disclosure belongs. The terms used herein in the present disclosure are only for the purpose of describing specific embodiments and are not intended to limit the present disclosure.

Figure 1:
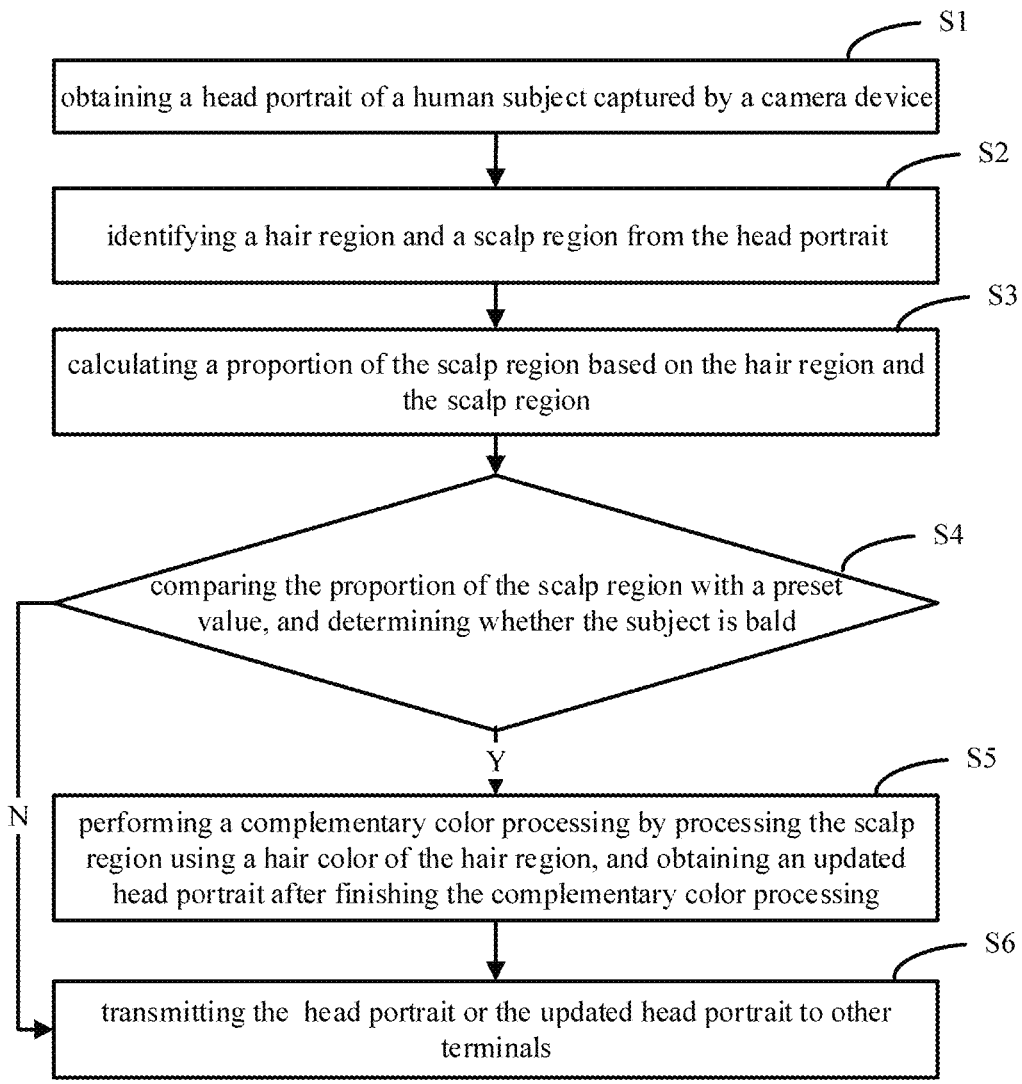
FIG. 1 is a flowchart diagram of a method for processing images in an embodiment of the present application.

FIG. 1 is a flowchart diagram of a method for processing images in an embodiment of the present application.

Figure 4:
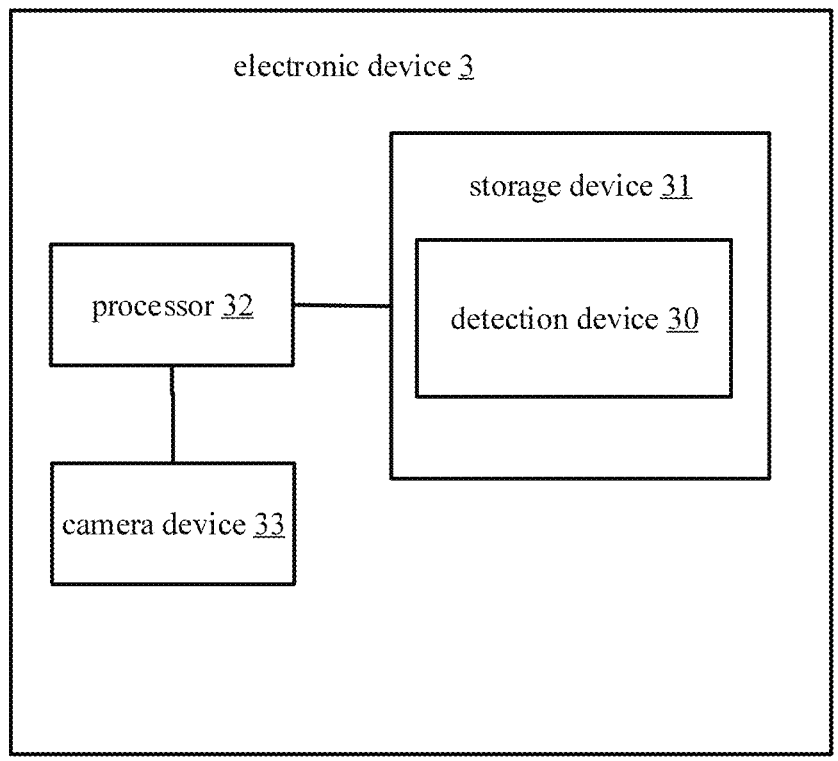
FIG. 4 is a structural diagram of an electronic device for processing images in an embodiment of the present application.

In one embodiment, the method for processing images may be applied to one or more electronic devices 3 (shown in FIG. 4). The electronic device 3 includes hardware, such as, but is not limited to, a microprocessor and an Application Specific Integrated Circuit (ASIC), a Field-Programmable Gate Array (FPGA), a Digital Signal Processor (DSP), embedded devices, for example.

The electronic device 3 may be any electronic product that can interact with a user, such as a personal computer, a tablet computer, a smart phone, a personal digital assistant (Personal Digital Assistant, PDA), a game console, an interactive network television (Internet Protocol Television, IPTV), or smart wearable device, for example.

The electronic device 3 may also include a network device and/or a user device. The network device includes, but is not limited to, a single network server, a server group including multiple network servers, or a cloud including a large quantity of hosts or network servers based on a cloud computing technology.

A network can include, but is not limited to, the Internet, a wide area network, a metropolitan area network, a local area network, and a virtual private network (VPN), for example.

In block S1, the electronic device 3 obtains a head portrait of a human subject captured by a camera device 33.

In one embodiment, the camera device 33 captures an image in real time. The electronic device 3 obtains a video captured by the camera device 33. The head portrait can be represented as an image corresponding to any frame of the video captured by the camera device 33.

In block S2, the electronic device 3 identifies a hair region and a scalp region from the head portrait.

In one embodiment, a plurality of coordinates of a face frame are determined from the head portrait by using a face detection algorithm, and an initial position is determined based on the plurality of coordinates of the face frame. The hair region and the scalp region are determined based on the initial position, a coordinate of each pixel in the head portrait, and a red, green, blue (RGB) value of each pixel.

In one embodiment, the face frame is determined by four coordinate points, which include a first coordinate point P1 (Xmin, Ymax), a second coordinate point P2 (Xmax, Ymax), a third coordinate point P3 (Xmin, Ymin), and a fourth coordinate point P4 (Xmax, Ymin). Xmax represents the largest X coordinate corresponding to the face frame in the head portrait, Xmin represents the smallest X coordinate corresponding to the face frame in the head portrait, Ymax represents the largest Y coordinate corresponding to the face frame in the head portrait, and Ymin represents the smallest Y coordinate corresponding to the face frame in the head portrait.

Figure 2:
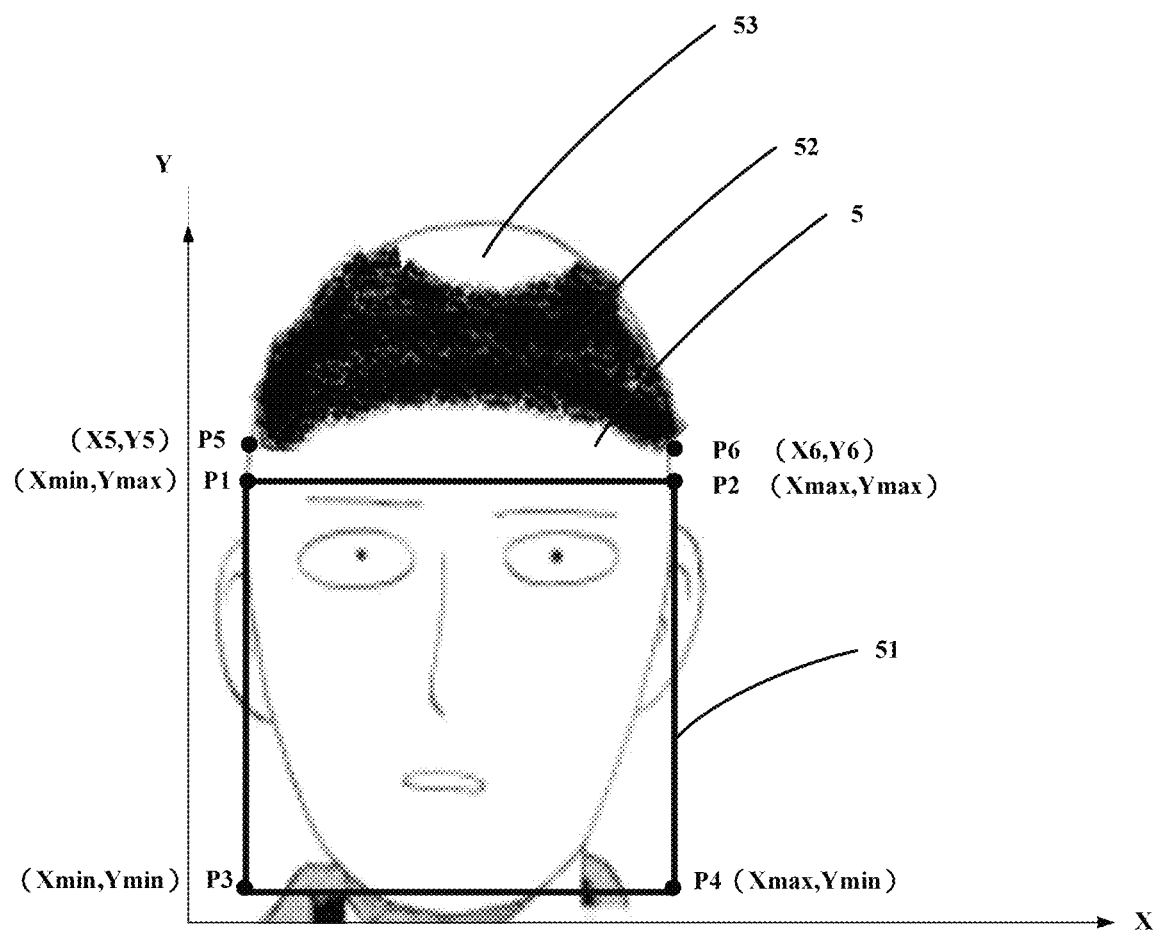
FIG. 2 is a diagram of a face frame in an embodiment of the present application.

For example, referring to FIG. 2, a face frame 51 of a head portrait 5 is determined by the first coordinate point P1, the second coordinate point P2, the third coordinate point P3, and the fourth coordinate point P4.

In one embodiment, the initial position is a line or a level formed by a fifth coordinate point P5 (X5, Y5) and a sixth coordinate point P6 (X6, Y6) in the head portrait, X5=Xmin, Y5=Ymax+a, X6=Xmax, Y6=Ymax+a, parameter "a" being a preset value. For example, parameter "a" is equal to five centimeters.

In one embodiment, a Y ordinate of each pixel in the hair region is greater than Y5 and Y6, and an RGB value of each pixel in the hair region is within a first preset range. That is, the Y ordinate of each pixel in the hair region is located above the initial position. For example, as shown in FIG. 2, a hair region 52 is determined.

The first preset range may be a range of RGB values corresponding to pure black and light black.

In one embodiment, a Y ordinate of each pixel in the scalp region is greater than Y5 and Y6, and an RGB value of each pixel in the scalp region is within a second preset range. That is, the Y ordinate of each pixel in the scalp region is located above the initial position. For example, as shown in FIG. 2, a scalp region 53 is determined.

The second preset range may be a range of RGB values corresponding to pure skin tones and light skin tones. In one embodiment, the first preset range and the second preset range do not intersect.

In block S3, the electronic device 3 calculates a proportion of the scalp region based on the hair region and the scalp region.

In one embodiment, a total number of pixels T1 occupied by the hair region is calculated, and a total number of pixels T2 occupied by the scalp region is calculated. The proportion P of the scalp region is calculated according to a formula of P=T2/(T1+T2)*100%.

In block S4, the electronic device 3 compares the proportion of the scalp region with a preset value, and the electronic device 3 determines whether the subject is bald. If the subject is determined to be bald, block S5 is executed. If the subject is determined to not be bald, block S6 is executed.

In one embodiment, in respond that the proportion of the scalp region is greater than or equal to the preset value, the subject is determined to be bald. In respond that the proportion of the scalp region is less than the preset value, the subject is determined to be not bald.

In block S5, the electronic device 3 performs complementary color processing by processing the scalp region using a hair color of the hair region, and the electronic device 3 obtains an updated head portrait after finishing the complementary color processing.

In one embodiment, an RGB value of each pixel of the scalp region can be set to any value within the first preset range.

In one embodiment, an average value of the RGB values of all pixels is calculated in the hair region. An RGB value of each pixel in the scalp region is replaced with the average value.

In one embodiment, a contour corresponding to the scalp region is extracted by using a contour extraction algorithm, an image from the hair region is copied according to a shape and a size of the contour, and the scalp region is covered using the copied image.

A shape of the copied image is the same as the shape of the contour, and a size of the copied image is the same as the size of the contour.

In block S6, the electronic device 3 transmits the head portrait or the updated head portrait to other terminals.

In one embodiment, in respond that a process is executed from block S5 to block S6, in block S6, the updated head portrait is transmitted to the other terminals. In respond that the process is executed from block S4 to block S6, in block S6, the head portrait obtained in block S1 is transmitted to the other terminals.

The other terminals may be a computer, a mobile phone, a tablet computer, etc.

In one embodiment, in response to a video communication, block S6 can be included. In response that the electronic device 3 is used to capture a picture, and the scalp region is color-complemented, block S6 can be excluded.

In the above embodiments, in respond that the electronic device 3 performs a video communication with the other terminals, the electronic device 3 determines baldness of each frame of images captured by the camera device 33. In respond that the subject is determined to be bald, the complementary color processing is performed on the scalp region, so that the scalp region can be the same as the hair region. Then a bald head portrait captured by the camera device 33 can be avoided being directly transmitted to the other terminals.

Figure 3:
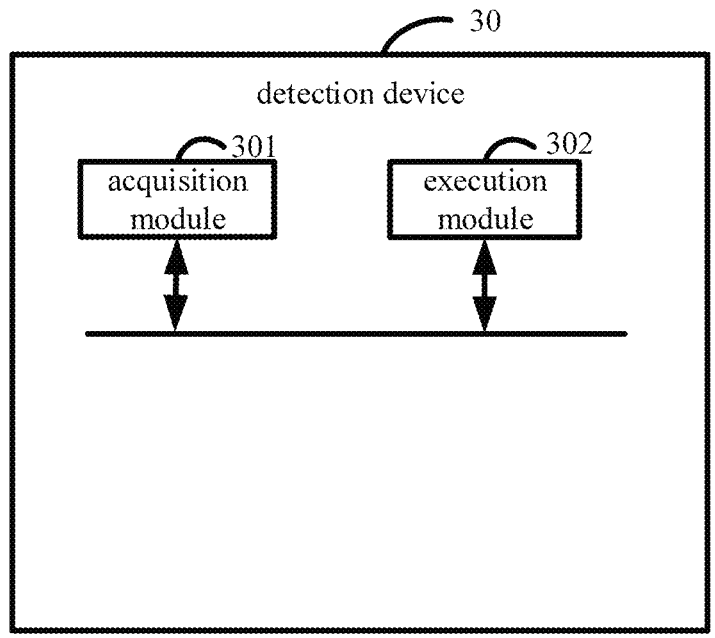
FIG. 3 is a structural diagram of a detection device in an embodiment of the present application.

FIG. 3 is a structural diagram of a detection device in an embodiment of the present application.

As shown in FIG. 3, a detection device 30 includes an acquisition module 301 and an execution module 302. The modules in the present application refer to one of a stored series of computer-readable instruction segments that can be executed by at least one processor and that are capable of performing preset functions. In some embodiments, the functions of each module will be described.

The acquisition module 301 obtains a head portrait of a human subject captured by a camera device 33. The execution module 302 identifies a hair region and a scalp region from the head portrait, and the execution module 302 calculates a proportion of the scalp region based on the hair region and the scalp region. The execution module 302 compares the proportion of the scalp region with a preset value, and the execution module 302 determines whether the subject is bald. In respond that the subject is determined to be bald, the execution module 302 performs complementary color processing by processing the scalp region using a hair color of the hair region, and the execution module 302 obtains an updated head portrait after finishing the complementary color processing. The execution module 302 transmits the updated head portrait to other terminals.

FIG. 4 is a structural diagram of an electronic device for processing images in an embodiment of the present application.

The electronic device 3 may include a storage device 31, at least one processor 32, and the camera device 33. Computer-readable instructions are stored in the storage device 31 and executable by the at least one processor 32.

Those skilled in the art will understand that FIG. 4 is only an example of the electronic device 3 and does not constitute a limitation on the electronic device 3. Another example of electronic device 3 may include more or fewer components than shown in the figures or may combine some components or have different components. For example, the electronic device 3 may further include an input/output device, a network access device, a bus, and the like.

The at least one processor 32 can be a central processing unit (CPU), or can be another general-purpose processor, digital signal processor (DSPs), application-specific integrated circuit (ASIC), Field-Programmable Gate Array (FPGA), another programmable logic device, discrete gate, transistor logic device, or discrete hardware component, etc. The processor 32 can be a microprocessor or any conventional processor. The processor 32 is a control center of the electronic device 3 and connects various parts of the entire electronic device 3 by using various interfaces and lines.

The processor 32 executes the computer-readable instructions to implement the method in the embodiments described above, such as in blocks S1-S6 shown in FIG. 1. Alternatively, the processor 32 executes the computer-readable instructions to implement the functions of the modules/units in the foregoing device embodiments, such as the modules 301-302 in FIG. 3.

For example, the computer-readable instructions can be divided into one or more modules/units, and the one or more modules/units are stored in the storage device 31 and executed by the at least one processor 32. The one or more modules/units can be a series of computer-readable instruction segments capable of performing specific functions, and the instruction segments are used to describe execution processes of the computer-readable instructions in the electronic device 3. For example, the computer-readable instructions can be divided into the acquisition module 301, the execution module 302 is as shown in FIG. 3.

The storage device 31 can be configured to store the computer-readable instructions and/or modules/units. The processor 32 may run or execute the computer-readable instructions and/or modules/units stored in the storage device 31 and may call up data stored in the storage device 31 to implement various functions of the electronic device 3. The storage device 31 mainly includes a storage program area and a storage data area. The storage program area may store an operating system, and an application program required for at least one function (such as a sound playback function, an image playback function, for example). The storage data area may store data (such as audio data, phone book data, for example) created during the use of the electronic device 3. In addition, the storage device 31 may include a high-speed random access memory, and may also include a non-transitory storage medium, such as a hard disk, an internal memory, a plug-in hard disk, a smart media card (SMC), a secure digital (SD) Card, a flashcard, at least one disk storage device, a flash memory device, or another non-transitory solid-state storage device.

The storage device 31 may be an external memory and/or an internal memory of the electronic device 3. The storage device 31 may be a memory in a physical form, such as a memory stick, a Trans-flash Card (TF card), for example.

When the modules/units integrated into the electronic device 3 are implemented in the form of software functional units having been sold or used as independent products, they can be stored in a non-transitory readable storage medium. Based on this understanding, all or part of the processes in the methods of the above embodiments implemented by the present disclosure can also be completed by related hardware instructed by computer-readable instructions. The computer-readable instructions can be stored in a non-transitory readable storage medium. The computer-readable instructions, when executed by the processor, may implement the steps of the foregoing method embodiments. The computer-readable instructions include computer-readable instruction codes, and the computer-readable instruction codes can be in a source code form, an object code form, an executable file, or some intermediate form. The non-transitory readable storage medium can include any entity or device capable of carrying the computer-readable instruction code, such as a recording medium, a U disk, a mobile hard disk, a magnetic disk, an optical disk, a computer memory, or a read-only memory (ROM).

With reference to FIG. 1, the storage device 31 in the electronic device 3 stores a plurality of instructions to implement a method for processing images, and the processor 32 can execute the multiple instructions to: obtain a head portrait of a human subject captured by a camera device; identify a hair region and a scalp region from the head portrait; calculate a proportion of the scalp region based on the hair region and the scalp region; compare the proportion of the scalp region with a preset value, and determine whether the subject is bald; and in respond that the subject is determined to be bald, perform a complementary color processing by processing the scalp region using a hair color of the hair region, and obtain an updated head portrait after finishing the complementary color processing.

The computer-readable instructions are executed by the processor 32 to perform the functions of each module/unit in the above-mentioned device embodiments, which will not be repeated here.

In the several embodiments provided in the preset application, the disclosed electronic device and method can be implemented in other ways. For example, the embodiments of the devices described above are merely illustrative. For example, divisions of the modules are based on logical function only, and there can be other manners of division in actual implementation.

In addition, each functional module in each embodiment of the present disclosure can be integrated into one processing module, or can be physically present separately in each unit or two or more modules can be integrated into one module. The above modules can be implemented in a form of hardware or in a form of a software functional unit.

Therefore, the present embodiments are considered as illustrative and not restrictive, and the scope of the present disclosure is defined by the appended claims. All changes and variations in the meaning and scope of equivalent elements are included in the present disclosure. Any reference sign in the claims should not be construed as limiting the claim.

Moreover, the word "comprising" does not exclude other units nor does the singular exclude the plural. A plurality of units or devices stated in the system claims may also be implemented by one unit or device through software or hardware. Words such as "first" and "second" are used to indicate names, but not in any particular order.

Finally, the above embodiments are only used to illustrate technical solutions of the present disclosure and are not to be taken as restrictions on the technical solutions. Although the present disclosure has been described in detail with reference to the above embodiments, those skilled in the art should understand that the technical solutions described in one embodiment can be modified, or some of the technical features can be equivalently substituted, and that these modifications or substitutions are not to detract from the essence of the technical solutions or from the scope of the technical solutions of the embodiments of the present disclosure.

What is claimed is:

1. A method for processing images, the method comprising:
    obtaining a head portrait of a human subject captured by a camera device;
    identifying a hair region and a scalp region from the head portrait, comprising: determining a plurality of coordinates of a face frame from the head portrait by using a face detection algorithm, wherein the face frame is determined by four coordinate points, which comprise a first coordinate point P1 (Xmin, Ymax), a second coordinate point P2 (Xmax, Ymax), a third coordinate point P3 (Xmin, Ymin), and a fourth coordinate point P4 (Xmax, Ymin), Xmax represents the largest X coordinate corresponding to the face frame in the head portrait, Xmin represents the smallest X coordinate corresponding to the face frame in the head portrait, Ymax represents the largest Y coordinate corresponding to the face frame in the head portrait, and Ymin represents the smallest Y coordinate corresponding to the face frame in the head portrait; determining an initial position based on the plurality of coordinates of the face frame; and determining the hair region and the scalp region based on the initial position, a coordinate of each pixel in the head portrait, and a red, green, blue (RGB) value of each pixel;
    calculating a proportion of the scalp region based on the hair region and the scalp region;
    comparing the proportion of the scalp region with a preset value, and determining whether the subject is bald; and
    in respond that the subject is determined to be bald, performing a complementary color processing by processing the scalp region using a hair color of the hair region, and obtaining an updated head portrait after finishing the complementary color processing.

2. The method of claim 1, further comprises:
    transmitting the updated head portrait to other terminals.

3. The method of claim 1, wherein
    the initial position is a position of a line formed by a fifth coordinate point P5 (X5, Y5) and a sixth coordinate point P6 (X6, Y6) in the head portrait, X5=Xmin, Y5=Ymax+a, X6=Xmax, Y6=Ymax+a, parameter "a" is a preset value;

wherein, a Y ordinate of each pixel in the hair region is greater than Y5 and Y6, and an RGB value of each pixel in the hair region is within a first preset range;

a Y ordinate of each pixel in the scalp region is greater than Y5 and Y6, and an RGB value of each pixel in the scalp region is within a second preset range; and the first preset range and the second preset range have no intersection.

4. The method of claim 3, wherein calculating the proportion of the scalp region based on the hair region and the scalp region comprises:

calculating a total number of pixels occupied by the hair region;

calculating a total number of pixels occupied by the scalp region; and calculating the proportion of the scalp region according to a formula of P=T2/(T1+T2)*100%, wherein P represents the proportion of the scalp region, T1 represents the total number of pixels occupied by the hair region, and T2 represents the total number of pixels occupied by the scalp region.

5. The method of claim 4, wherein performing the complementary color processing by processing the scalp region using the hair color of the hair region comprises:

setting the RGB value of each pixel in the scalp region to any value within the first preset range.

6. The method of claim 4, wherein performing the complementary color processing by processing the scalp region using the hair color of the hair region comprises:

calculating an average value of the RGB values of all pixels in the hair region; and replacing the RGB value of each pixel in the scalp region using the average value.

7. The method of claim 4, wherein performing the complementary color processing by processing the scalp region using the hair color of the hair region comprises:

extracting a contour corresponding to the scalp region by using a contour extraction algorithm;

copying an image from the hair region according to a shape and a size of the contour; and filling in the scalp region using the copied image.

8. An electronic device comprising:

a processor; and a storage device storing a plurality of instructions, which when executed by the processor, cause the processor to:

obtain a head portrait of a human subject captured by a camera device;

identify a hair region and a scalp region from the head portrait, comprising: determine a plurality of coordinates of a face frame from the head portrait by using a face detection algorithm, wherein the face frame is determined by four coordinate points, which comprise a first coordinate point P1 (Xmin, Ymax), a second coordinate point P2 (Xmax, Ymax), a third coordinate point P3 (Xmin, Ymin), and a fourth coordinate point P4 (Xmax, Ymin), Xmax represents the largest X coordinate corresponding to the face frame in the head portrait, Xmin represents the smallest X coordinate corresponding to the face frame in the head portrait, Ymax represents the largest Y coordinate corresponding to the face frame in the head portrait, and Ymin represents the smallest Y coordinate corresponding to the face frame in the head portrait; determine an initial position based on the plurality of coordinates of the face frame; and determine the hair region and the scalp region based on the initial position, a coordinate of each pixel in the head portrait, and a red, green, blue (RGB) value of each pixel;

calculate a proportion of the scalp region based on the hair region and the scalp region;

compare the proportion of the scalp region with a preset value, and determine whether the subject is bald; and in respond that the subject is determined to be bald, perform a complementary color processing by processing the scalp region using a hair color of the hair region, and obtain an updated head portrait after finishing the complementary color processing.

9. The electronic device of claim 8, wherein the processor is further caused to:

transmit the updated head portrait to other terminals.

10. The electronic device of claim 8, wherein the initial position is a position of a line formed by a fifth coordinate point P5 (X5, Y5) and a sixth coordinate point P6 (X6, Y6) in the head portrait, X5=Xmin, Y5=Ymax+a, X6=Xmax, Y6=Ymax+a, parameter "a" is a preset value;

wherein, a Y ordinate of each pixel in the hair region is greater than Y5 and Y6, and an RGB value of each pixel in the hair region is within a first preset range;

a Y ordinate of each pixel in the scalp region is greater than Y5 and Y6, and an RGB value of each pixel in the scalp region is within a second preset range; and the first preset range and the second preset range have no intersection.

11. The electronic device of claim 10, wherein the processor is further caused to:

calculate a total number of pixels occupied by the hair region;

calculate a total number of pixels occupied by the scalp region; and calculate the proportion of the scalp region according to a formula of P=T2/(T1+T2)*100%, wherein P represents the proportion of the scalp region, T1 represents the total number of pixels occupied by the hair region, and T2 represents the total number of pixels occupied by the scalp region.

12. The electronic device of claim 11, wherein the processor is further caused to:

extract a contour corresponding to the scalp region by using a contour extraction algorithm;

copy an image from the hair region according to a shape and a size of the contour; and fill in the scalp region using the copied image.

13. A non-transitory storage medium having stored thereon at least one computer-readable instructions that, when executed by a processor of an electronic device, causes the processor to perform a method for detecting image abnormalities, the method comprising:

obtaining a head portrait of a human subject captured by a camera device;

identifying a hair region and a scalp region from the head portrait, comprising: determining a plurality of coordinates of a face frame from the head portrait by using a face detection algorithm, wherein the face frame is determined by four coordinate points, which comprise a first coordinate point P1 (Xmin, Ymax), a second coordinate point P2 (Xmax, Ymax), a third coordinate point P3 (Xmin, Ymin), and a fourth coordinate point P4 (Xmax, Ymin), Xmax represents the largest X coordinate corresponding to the face frame in the head portrait, Xmin represents the smallest X coordinate corresponding to the face frame in the head portrait, Ymax represents the largest Y coordinate corresponding to the face frame in the head portrait, and Ymin represents the smallest Y coordinate corresponding to the face frame in the head portrait; determining an initial position based on the plurality of coordinates of the face frame; and determining the hair region and the scalp region based on the initial position, a coordinate of each pixel in the head portrait, and a red, green, blue (RGB) value of each pixel;

calculating a proportion of the scalp region based on the hair region and the scalp region;

comparing the proportion of the scalp region with a preset value, and determining whether the subject is bald; and in respond that the subject is determined to be bald, performing a complementary color processing by processing the scalp region using a hair color of the hair region, and obtaining an updated head portrait after finishing the complementary color processing.

14. The non-transitory storage medium of claim 13, wherein the method further comprises:

transmitting the updated head portrait to other terminals.

15. The non-transitory storage medium of claim 13, wherein the initial position is a position of a line formed by a fifth coordinate point P5 (X5, Y5) and a sixth coordinate point P6 (X6, Y6) in the head portrait, X5=Xmin, Y5=Ymax+a, X6=Xmax, Y6=Ymax+a, parameter "a" is a preset value;

wherein, a Y ordinate of each pixel in the hair region is greater than Y5 and Y6, and an RGB value of each pixel in the hair region is within a first preset range;

a Y ordinate of each pixel in the scalp region is greater than Y5 and Y6, and an RGB value of each pixel in the scalp region is within a second preset range; and the first preset range and the second preset range have no intersection.

16. The non-transitory storage medium of claim 13, wherein calculating the proportion of the scalp region based on the hair region and the scalp region comprises:

calculating a total number of pixels occupied by the hair region;

calculating a total number of pixels occupied by the scalp region; and calculating the proportion of the scalp region according to a formula of P=T2/(T1+T2)*100%, wherein P represents the proportion of the scalp region, T1 represents the total number of pixels occupied by the hair region, and T2 represents the total number of pixels occupied by the scalp region.

17. The non-transitory storage medium of claim 16, wherein performing the complementary color processing by processing the scalp region using the hair color of the hair region comprises:

extracting a contour corresponding to the scalp region by using a contour extraction algorithm;

copying an image from the hair region according to a shape and a size of the contour; and filling in the scalp region using the copied image.

* * * * *